Patented Apr. 3, 1951

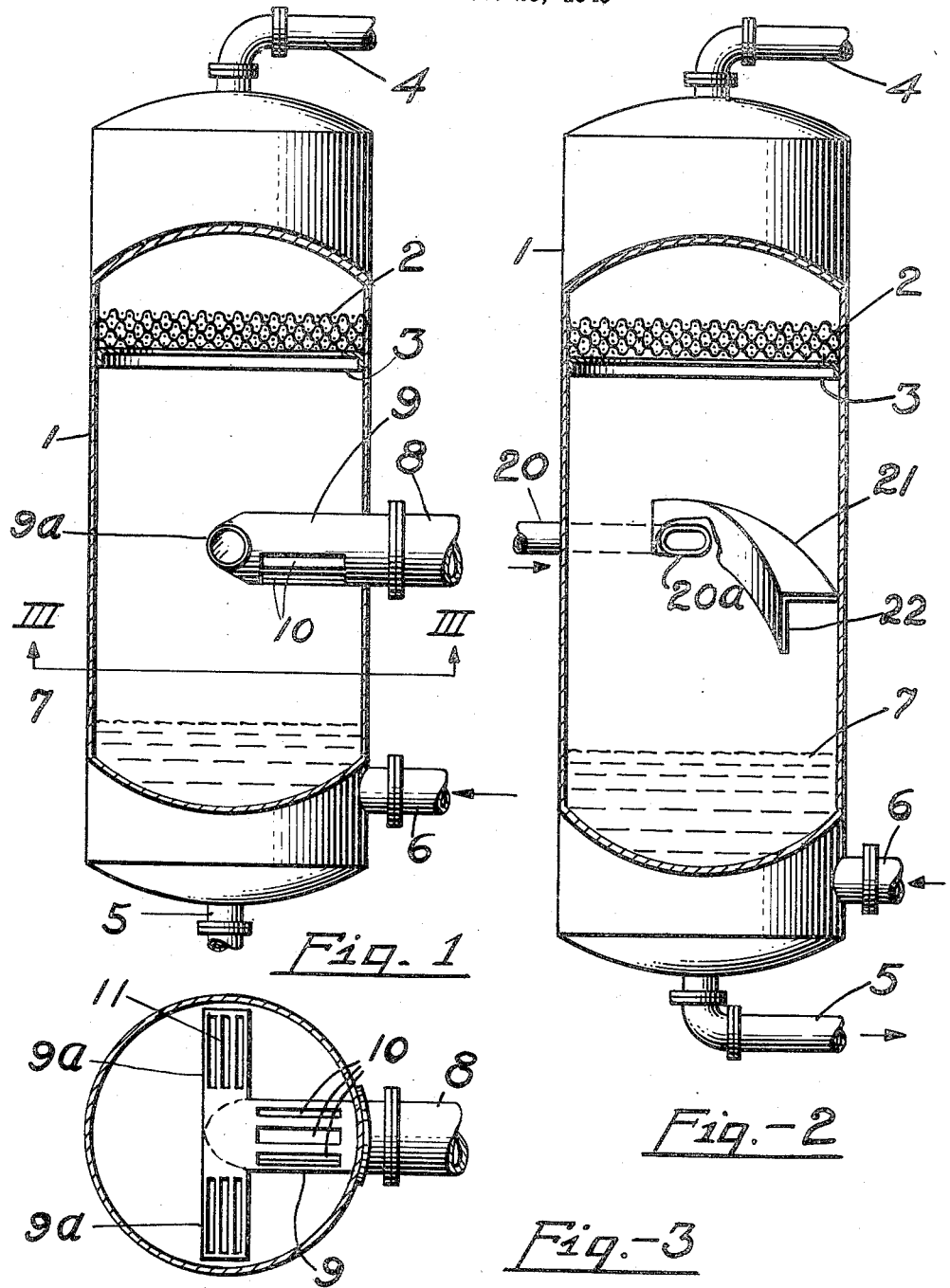

2,547,769

UNITED STATES PATENT OFFICE 2,547,769

ENTRAINMENT SEPARATOR

John W. Packie, Maplewood, and Cyril O. Rhys, Jr., Cranford, N. J., assignors to Standard Oil Development Company, a corporation of Delaware Application February 26, 1949, Serial No. 78,532

1 Claim. (Cl. 183—67)

The present invention relates to an apparatus for separating entrained liquids from vaporous or gaseous materials including hydrocarbon materials, steam or air. More particularly, the invention relates to the construction of a form of apparatus sometimes known as a "knockout" drum.

In the handling of vaporous or gaseous materials, it is frequently necessary to employ pumps and compressors for transferring such materials, or for increasing pressure thereon. In such handling, it is usually essential that liquids which may be entrained in a stream of the materials being handled be removed prior to introduction into the compressor, or other apparatus of a similar nature. For example, in the operation of a steam turbine, it is necessary to remove practically all entrained liquid from the steam to prevent deposition of solids, carried as dissolved salts in the entrained water, on the blades of the turbine. Similarly, in the operation of gas compressors handling hydrocarbon gases, it is necessary to remove entrained liquid hydrocarbons to prevent cutting of lubricants used in the compressor and to prevent other damage thereto.

It is an object of the present invention to provide an apparatus in which more efficient separation of entrained liquids from a stream of vaporous or gaseous materials may be obtained, and in which the operating characteristics of the ordinary separator apparatus are so modified as to substantially improve the efficiency thereof.

The invention and its objects will be more fully understood from the following description when read in conjunction with the accompanying drawings, in which Figure 1 is a side elevational view partly in vertical section of a typical installation;

Figure 2 is a similar view of an alternate form of the apparatus, and

Figure 3 is a horizontal section along the line III—III of Figure 1.

Referring more particularly to the drawings, the numeral 1 designates a vertical separator drum having a horizontal baffle member 2 supported laterally of the drum, as by means of an angular supporting ring 3, at a level above the middle of the drum and in spaced relation to the upper end thereof. An outlet for the processed vaporous material is provided at the upper end of the drum, as indicated by the numeral 4, and an outlet for separated entrained liquids is provided at the bottom of the drum, as indicated by the numeral 5. Where such separated liquids are to be returned or recirculated in a liquid stream, fresh liquid feed to the system may be introduced through the drum as by way of line 6. In this way, some degree of direct heat exchange between the separated liquid and the fresh feed may be obtained and, under certain conditions, gaseous materials contained in the fresh feed may be released in the "knockout" drum. Normally, the separated liquid and fresh feed, where introduced in this manner, will be maintained with a predetermined liquid level in the drum, as indicated by the broken line 7. Suitable gauge glasses and automatic level control means may be provided to indicate or maintain the predetermined liquid level. Pressure indicating and control means may also be provided to indicate or maintain any desired predetermined pressure in the drum.

In the form of apparatus illustrated by Figures 1 and 3, the vapor or gas containing entrained liquids is introduced into the drum by way of the conduit 8, and a distributor T 9 internally of the drum 1 disposed between the predetermined liquid level 7 and the baffle 2 with the arms of the T 9a extending at right angles to the body portion diametrically across the drum into closely spaced relation to opposite wall portions thereof. The inlet line 8 preferably opens through the wall of the drum 1 at a level spaced from the top tangent line of the drum by a distance equal to 1.5 times the diameter of the drum. The liquid level 7 will usually be located in the drum in a plane spaced from the inlet 8 at a distance not less than .75 times the diameter of the drum but may be varied above such level by a substantial amount. The T member 9 with its arm portions 9a is provided with a plurality of longitudinal slots 10 and 11 respectively. These slots are arranged to open downwardly through the under surface of the T portions within an arc spaced at either end from the horizontal diameter of said portions by not substantially less than a 30° angle. The slotted portions in the T arms 9a extend from closely spaced relation to the outer blank ends into equally spaced relation to the line of the body portion at either side. As shown, the T arm portions are formed from a single tubular element of slightly smaller diameter than the body portion of the T, but may have the same diameter as the body portion of the T, where desired, or may be formed of two separate tubular elements opening through opposite side wall portions of the T body.

In operation, a gaseous material carrying entrained liquid is introduced into the drum by way of line 8 and the T 9, and is discharged from the T downwardly into the drum through slots 10 and 11. The contact of the gases with the inner surfaces of the T combined with the sudden change of direction of flow tends to disengage the entrained liquid from the gas. The liquid falls to the bottom of the drum while the gas or vapor, substantially reversing its direction of flow, moves upwardly through the tower through the baffle 2, this baffle being of substantial thickness, the gas moves through it in a tortuous path and any remaining entrained liquid is disengaged by contact with the baffle material, running downwardly through the interstitial passageways in the baffle material and falling back into the body of liquid maintained in the bottom of the drum. The substantially dry gas then passes outwardly from the drum through the line 4 for employment or further handling as required. The combination of a crinkled wire mesh baffle with a distributor element such as the T 9 results in a substantial improvement in the separating action of the drum primarily by overcoming the normal tendency of a gas discharged as from a distributor element to flow upwardly in greater volume and velocity along the walls of the drum than through the central portion thereof. This characteristic tends to re-entrain some portions of the partially disengaged liquid, carrying such liquid upward along the side walls of the drum. By the use of a crinkled wire baffle of substantial thickness disposed intermediate the distributor element 9 and the outlet of the drum 4, the surface film flow effect normally encountered is interrupted by the wire mesh baffle and the volume flow of gas is distributed more uniformly over the entire cross-sectional area of the drum.

In the combination, the slotted distributor T provides the primary means for disengaging entrained liquid and for introducing the gaseous material into the drum in a substantially uniform manner while the crinkled wire mesh baffle prevents the formation of concentrated flow streams within the drum above the distributor T and removes the final traces of entrained liquid too finely divided to be removed by contact with the surfaces of the distributor T, or by the centrifugal effect produced by angular discharge from the distributor T and sudden change of direction in the flow of the gaseous material.

In the alternate form of the apparatus illustrated by Figure 2, the gaseous material containing entrained liquid is introduced into the drum 1 by way of a line 20, having a discharge outlet 20a, opening into the drum tangentially through a side wall portion. The outlet 20a of the line 20 is provided with a helically formed shield 21 secured to the side wall portion of the drum adjacent the opening and spaced therefrom. The shield is formed with a substantially flat portion at its upper end extending outwardly from the drum wall above the outlet 20a and curves downwardly therefrom along the wall of the drum and in the line of discharge from the outlet at an angle of about 30° to the horizontal.

In the preferred form of construction, as shown in Figure 2, the baffle 21 is provided with a dependent skirt portion 22 confining the stream of materials, entering through the outlet 20a, to a downwardly extending helical flow path along the tower wall. By this means, the stream of gaseous material introduced is given a swirling motion which, by means of the shield, is directed downwardly within the tower. The centrifugal effect of the motion thus imparted tends to separate the major portion of the entrained liquid from the stream of gaseous material, the shield directing such separated liquid downwardly into the body of liquid maintained in the bottom of the tower. The shield 21 also serves to deflect and distribute the stream of gaseous material with a sudden change in direction of flow distributing the gaseous material more generally through the drum below the crinkled wire mesh baffle. Other details of operation of the form of apparatus illustrated in Figure 2 are substantially the same as that of the form illustrated by Figure 1. In either form of the apparatus, the combination of the crinkled wire mesh baffle and initial inlet baffle means results in more efficient distribution of the incoming vapor stream, and more complete distribution thereof, generally through all parts of the drum 1. This in turn results in reduction in concentration of vapor velocity in any part of the drum which normally would tend either to re-entrain small particles of liquid, or to prevent complete separation of such liquid from the vapor stream.

What is claimed is:

An entrainment separator comprising a separator drum having an outlet for liquids at its lower end and for vapors at its upper end, an inlet for gaseous material intermediate said ends, a flow distribution member internally of said drum, disposed in a lateral plane through the drum, including a tubular body element communicating at one end with said inlet, and at the other end with opposed tubular branch arm elements, forming a T, a slotted portion longitudinally of each of said elements opening downwardly therethrough within an arc spaced at either end from the horizontal diameter of said elements by an angle of not substantially less than 30°, said portions directing fluid flow through said inlet downwardly and distributing said gaseous material uniformly in the drum, and a crinkled wire mesh baffle of substantial thickness intermediate said inlet and the outlet for gaseous material.

JOHN W. PACKIE.
CYRIL O. RHYS, Jr.

REFERENCES CITED

The following references are of record in the file of this patent:

UNITED STATES PATENTS

| Number | Name | Date |
|---|---|---|
| 808,564 | McCorkindale | Dec. 26, 1905 |
| 1,422,412 | Garner | July 18, 1922 |
| 1,817,338 | Baker | Aug. 4, 1931 |